US012692715B2

(12) United States Patent
D'Aguanno

(10) Patent No.: US 12,692,715 B2
(45) Date of Patent: Jul. 28, 2026

(54) LIQUID-SUBMERSIBLE VACUUM SYSTEM AND COMPONENTS THEREOF

(71) Applicant: Matthew D'Aguanno, Port Washington, NY (US)

(72) Inventor: Matthew D'Aguanno, Port Washington, NY (US)

( * ) Notice: Subject to any disclaimer, the term of this patent is extended or adjusted under 35 U.S.C. 154(b) by 578 days.

(21) Appl. No.: 17/700,936

(22) Filed: Mar. 22, 2022

(65) Prior Publication Data

US 2023/0304312 A1 Sep. 28, 2023

(51) Int. Cl.
| | |
|---|---|
| *E04H 4/16* | (2006.01) |
| *B01D 29/11* | (2006.01) |
| *B01D 29/90* | (2006.01) |
| *C02F 1/00* | (2023.01) |
| *C02F 103/42* | (2006.01) |

(52) U.S. Cl.
CPC ........... *E04H 4/1636* (2013.01); *B01D 29/11* (2013.01); *B01D 29/902* (2013.01); *C02F 1/001* (2013.01); *C02F 2103/42* (2013.01)

(58) Field of Classification Search
CPC ...... B01D 29/11; B01D 29/902; B01D 29/13; B01D 29/15; B01D 29/17; B01D 29/115; E04H 4/1636; E04H 4/1618
See application file for complete search history.

(56) References Cited

U.S. PATENT DOCUMENTS

| | | | |
|---|---|---|---|
| 3,572,784 A | 3/1971 | Pansini | |
| 3,755,843 A | 9/1973 | Goertzen, III et al. | |

| | | | |
|---|---|---|---|
| 3,868,739 A | 3/1975 | Hargrave | |
| 3,886,616 A | 6/1975 | Hayes | |
| 4,240,173 A | 12/1980 | Sherrill | |
| 4,637,086 A | 1/1987 | Goode | |
| 4,718,129 A | 1/1988 | Miller | |
| 4,962,559 A | 10/1990 | Schuman | |
| 4,993,977 A * | 2/1991 | Rodler, Jr. ............. | B63H 11/08 415/189 |
| 5,185,545 A * | 2/1993 | Veronesi ................ | B63H 21/17 310/90 |
| 5,317,776 A | 6/1994 | DeMoura | |

(Continued)

FOREIGN PATENT DOCUMENTS

| | | | |
|---|---|---|---|
| CA | 2978295 A1 * | 12/2018 | ............. F01D 17/16 |
| CN | 207762400 U * | 8/2018 | |

(Continued)

OTHER PUBLICATIONS

International Search Report and The Written Opinion of the International Searching Authoirty, dated Oct. 19, 2018, corresponding to counterpart International Application No. PCT/US2018/013476; 18 total pages.

(Continued)

*Primary Examiner* — Ryan B Huang
(74) *Attorney, Agent, or Firm* — Carter, DeLuca & Farrell, LLP; George Likourezos

(57) ABSTRACT

A liquid-submersible vacuum system includes a housing enclosing a filtration element and a water pump, and a power converter configured to couple to a standard AC power supply. The vacuum system further includes a vacuum-to-waste assembly detachably coupled to the housing for selectively conveying filtered fluid from the vacuum system to a remote location.

20 Claims, 7 Drawing Sheets

(56)                 References Cited

U.S. PATENT DOCUMENTS

| | | | |
|---|---|---|---|
| 6,539,573 B1 | 4/2003 | Caccavella | |
| 6,797,157 B2 | 9/2004 | Erlich | |
| 6,939,460 B2 | 9/2005 | Erlich | |
| D518,253 S | 3/2006 | Erlich et al. | |
| 7,060,182 B2 | 6/2006 | Erlich et al. | |
| 7,437,790 B1 | 10/2008 | Ajello | |
| 7,520,015 B1* | 4/2009 | Ajello | E04H 4/1636 |
| | | | 210/167.16 |
| 8,281,441 B1 | 10/2012 | Erlich et al. | |
| D685,542 S | 7/2013 | Erlich et al. | |
| D720,101 S | 12/2014 | Erlich et al. | |
| 10,174,516 B2 | 1/2019 | D'Aguanno | |
| 2003/0159723 A1 | 8/2003 | Hui | |
| 2004/0189136 A1* | 9/2004 | Kolomeitsev | H02K 3/345 |
| | | | 310/216.082 |
| 2005/0279683 A1 | 12/2005 | Erlich | |
| 2006/0265820 A1 | 11/2006 | Erlich et al. | |
| 2011/0000731 A1 | 1/2011 | Boeckler | |
| 2011/0247970 A1 | 10/2011 | Evingham | |
| 2013/0334113 A1 | 12/2013 | Erlich | |
| 2016/0281380 A1 | 9/2016 | Durvasula et al. | |
| 2016/0326763 A1 | 11/2016 | Bruneel | |
| 2017/0260766 A1 | 9/2017 | Hui | |
| 2018/0148947 A1 | 5/2018 | Durvasula et al. | |
| 2020/0308858 A1* | 10/2020 | D'Aguanno | E04H 4/1645 |

FOREIGN PATENT DOCUMENTS

| | | |
|---|---|---|
| FR | 2480340 A1 | 10/1981 |
| FR | 2729995 A1 | 8/1996 |

OTHER PUBLICATIONS

International Search Report and Written Opinion issued by the ISA/US in connection with International Application No. PCT/US23/13926, dated Jun. 27, 2023.

International Preliminary Report on Patentability issued by the International Bureau of WIPO in connection with International Application No. PCT/US23/13926, dated Sep. 24, 2024.

* cited by examiner

LIQUID-SUBMERSIBLE VACUUM SYSTEM AND COMPONENTS THEREOF

BACKGROUND

Swimming pools accumulate debris over a period of time. Some of the debris is cleaned from the pool water as the water is recycled and filtered. Other debris sinks to the bottom of the pool and is not cleaned during water recycling and filtration. To clean the debris that sink to the bottom of the pool, a swimming pool vacuum cleaner may be employed.

Devices have been created that unsuccessfully clean debris, including hand-held, battery-operated systems, which have a finite application due to a limited battery life; in-floor cleaning systems or a robotic device, both of which are extremely expensive, bulky and hard to use systems; and other devices which use a power source which creates an electrocution risk.

SUMMARY

To achieve the foregoing and other advantages, the present disclosure provides a swimming pool vacuum system with a continuous external power source and is fully contained, powerful, and portable. The vacuuming system has a detachable vacuum-to-waste assembly for removing standing or pooling water and discharging the water elsewhere without inhibiting fluid flow through the vacuum system.

In accordance with an aspect of the present disclosure, a vacuum-to-waste assembly is provided that is configured to receive filtered fluid from a liquid-submersible vacuum system and convey the filtered fluid to an external location. The vacuum-to-waste assembly includes a discharge hose cap defining a longitudinal passageway therethrough and configured to couple to a hose, and a stator assembly configured to be received in the discharge hose cap. The stator assembly includes a conical main body and a plurality of fins protruding radially outward from the main body and extending along a length of the main body. A pair of adjacent fins defines a channel therebetween configured to guide fluid proximally through the discharge hose cap.

In aspects, the stator assembly may be non-rotatably secured within the discharge hose cap such that the stator assembly is non-rotatable relative to the discharge hose cap.

In aspects, the stator assembly may include an outer ring positioned about and radially spaced from a distal end portion of the main body. The outer ring may be engaged with a distal end portion of each of the plurality of fins.

In aspects, the outer ring, the distal end portion of each of the plurality of fins, and the distal end portion of the main body may collectively define a plurality of discrete channels configured to receive fluid therethrough.

In aspects, the outer ring may have an outer surface defining a plurality of recesses therein configured for receipt of a respective tab of the discharge hose cap to non-rotatably secure the stator assembly within the discharge hose cap.

In aspects, the plurality of fins may be circumferentially spaced from one another about the main body.

In aspects, each of the fins may curve in a clockwise direction of the main body such that a distal end portion of a first fin is positioned clockwise relative to a proximal end portion of the first fin.

In aspects, each of the fins may have an outer edge configured to sit flush against an inner surface of the discharge hose cap.

In aspects, the discharge hose cap may have a funnel-shape.

In accordance with another aspect of the present disclosure, a liquid-submersible vacuum system is provided that includes a housing having a proximal end portion and a distal end portion, a DC pump disposed within a chamber defined in the housing, an impeller positioned at the proximal end portion of the housing and configured to rotate in response to an activation of the DC pump, a filter disposed within the housing such that water moves through the filter during activation of the DC pump, a power converter configured to electrically connect to the DC pump for providing power to the DC pump, and a vacuum-to-waste assembly. The DC pump is configured to move water proximally toward the proximal end portion of the housing, and the power converter is located remotely from the housing. The vacuum-to-waste assembly includes a discharge hose cap, and a stator assembly configured to be received in the discharge hose cap. The discharge hose cap defines a longitudinal passageway therethrough and is configured to be in fluid communication with the chamber of the housing. The stator assembly includes a main body configured to be positioned adjacent and proximally of the impeller, and a plurality of fins protruding radially outward from the main body and extending along a length of the main body. A pair of adjacent fins defines a channel therebetween configured to guide fluid proximally through the discharge hose cap.

In aspects, the main body of the stator assembly may have a distal end portion configured to abut a proximal end portion of the impeller. The impeller may be configured to rotate relative to the main body.

In aspects, the discharge hose cap may have a funnel-shape and the main body may have a conical shape.

In aspects, the liquid-submersible vacuum system may further include a vacuum head configured to couple to the distal end portion of the housing. The vacuum head includes a housing and a plurality of wheels secured to the housing of the vacuum head. The housing of the vacuum head may define an internal cavity therein, an inlet port in fluid communication with the internal cavity, and an outlet port in fluid communication with the internal cavity and spaced from the inlet port. The inlet port may have a larger volume than the outlet port.

Other features of the present disclosure will be appreciated from the following description.

DETAILED DESCRIPTION

With reference to the drawings, a liquid-submersible vacuum system embodying the principles and concepts of the present disclosure will be described.

As used herein the term "proximal" refers to that portion of the vacuum system that is closer to a user and farther from a cleaning surface, while the term "distal" refers to that portion of the vacuum system that is farther from the user and closer to the cleaning surface.

Figure 1:
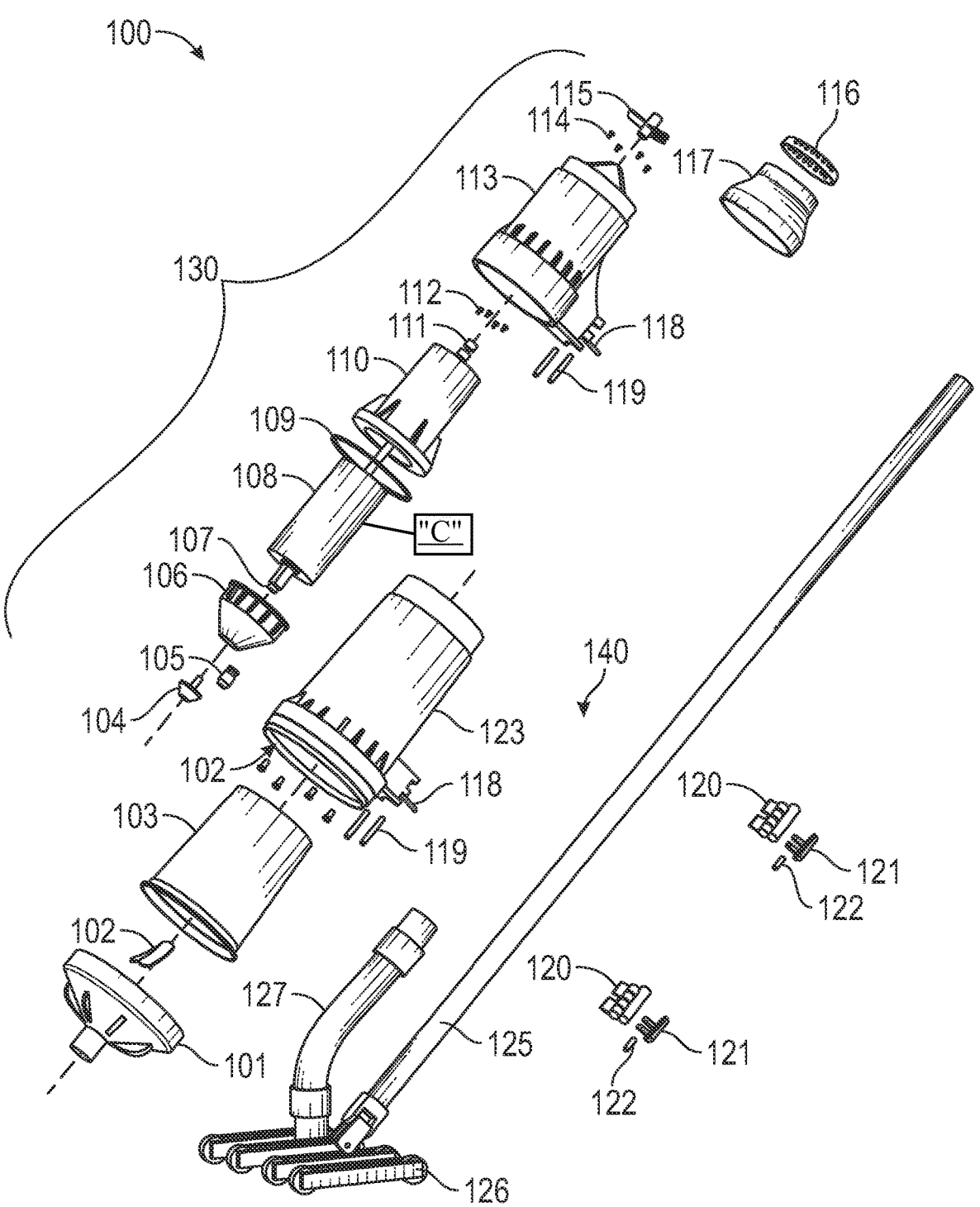
FIG. 1 is an exploded view of an embodiment of a liquid-submersible vacuum system.

With reference to FIG. 1, a pool vacuum system 100 is illustrated that is configured to vacuum debris (e.g., silt, sand, dirt, leaves and water from the bottom of a pool) and filter the water from the bottom of a pool. The filtered water may be dispensed through a diffuser cap 116 back into the pool. Alternatively, the diffuser cap 116 may be detached from the proximal end of the vacuum system 100 and replaced with a vacuum-to-waste assembly 200 (FIG. 2) configured to discharge the water from the pool or other water source to another location. The vacuum system 100 is configured to receive power from a standard 110/120/220 electric outlet via an outdoor extension cord and includes a pump or motor 108 (e.g., a 24 DC volt underwater pump capable of moving 40-65 GPM), and a power converter "C" connected to the pump 108 for supplying DC power to the pump 108 from an AC power source. As such, the vacuum system 100 does not require any battery replacement and the vacuum pump never loses power due to the use of a direct external power source.

Further details regarding the pump 108 and the power converter "C" may be found, for example, in U.S. Pat. No. 10,174,516, the entire contents of which being incorporated by reference herein.

With further reference to FIG. 1, the pool vacuum system 100 generally includes proximal and distal housings 113, 123 secured to one another to collectively define the internal chamber 102, a pump assembly 130 positioned within the internal chamber 102 of the proximal and distal housings 113, 123, and a pole assembly 140 detachably coupled to the proximal and distal housings 113, 123. The proximal housing 113 is opened at the proximal end thereof and has an outlet housing 117 secured thereto and the diffuser cap 116 detachably coupled to the outlet housing 117. An impeller 115 is coupled to the proximal end of the proximal housing 113 and motor housing mounting screws 114 are threadedly engaged to the proximal end of the proximal housing 113.

The pump assembly 130 includes motor mounting screws 112 threadedly engaged to the proximal end of an inner motor housing 110 of the pump assembly 130. A motor shaft 111 is operably coupled to the motor 108 and non-rotatably coupled to the impeller 115 such that a rotation of the motor drive shafts 111 causes a rotation of the impeller 115. A housing seal 109 is in flush engagement with an inner distal surface of the inner motor housing 110. The pump 108 of the pump assembly 130 may be a mixed flow axial pump and is located within the inner motor housing 110 and engaged with the motor shaft 111. In aspects, the pump 108 may be a VDC motor. A motor housing cover clamp nut 107 is coupled to the distal end of the motor 108. A motor housing cover 106 is detachably coupled to the inner distal surface of the inner motor housing 110 to form a water-tight enclosure for the motor 108. The motor housing cover 106 is configured to receive a wire gland 105 into the opening located on the proximal end of the motor housing cover 106. A motor housing cover clamp bolt 104 is configured to threadedly engage the motor housing cover clamp nut 107 through the opening of the wire gland 105 and the motor housing cover 106.

The vacuum system 100 further includes a filter bag or cage 103 removably received in the distal housing 123, and an inlet housing 101 coupled to a distal end of the distal housing 123 to enclose the filter bag 103 therein. A flapper valve 102 is operably coupled to an inner portion of the inlet housing 101. The inlet housing 101 has a proximal opening in fluid communication with an inlet of the filter bag 103, and a distal opening configured to be detachably engaged to a proximal end of an inlet hose 127 of the pole assembly 140.

The pole assembly 140 further includes a vacuum head 126 detachably coupled to a distal end of the inlet hose 127, and a pole or shaft 125 detachably coupled to the vacuum head 126 to allow for manipulation of the vacuum head 126 by a user. Each of the proximal and distal housings 113, 123 has a clamp adjustment screw 118 and clamp hinge pins 119 configured to engage and couple to a respective hinged clamp 120 positioned along the pole 125. The clamp adjustment screw 118 is threadedly coupled to the pole 125 to engage with the hinged clamp 120. The hinged clamp 120 incudes a clamp lever 121 and a barrel nut 122 configured to secure the proximal and distal housings 113, 123 to the pole 125.

Figure 2:
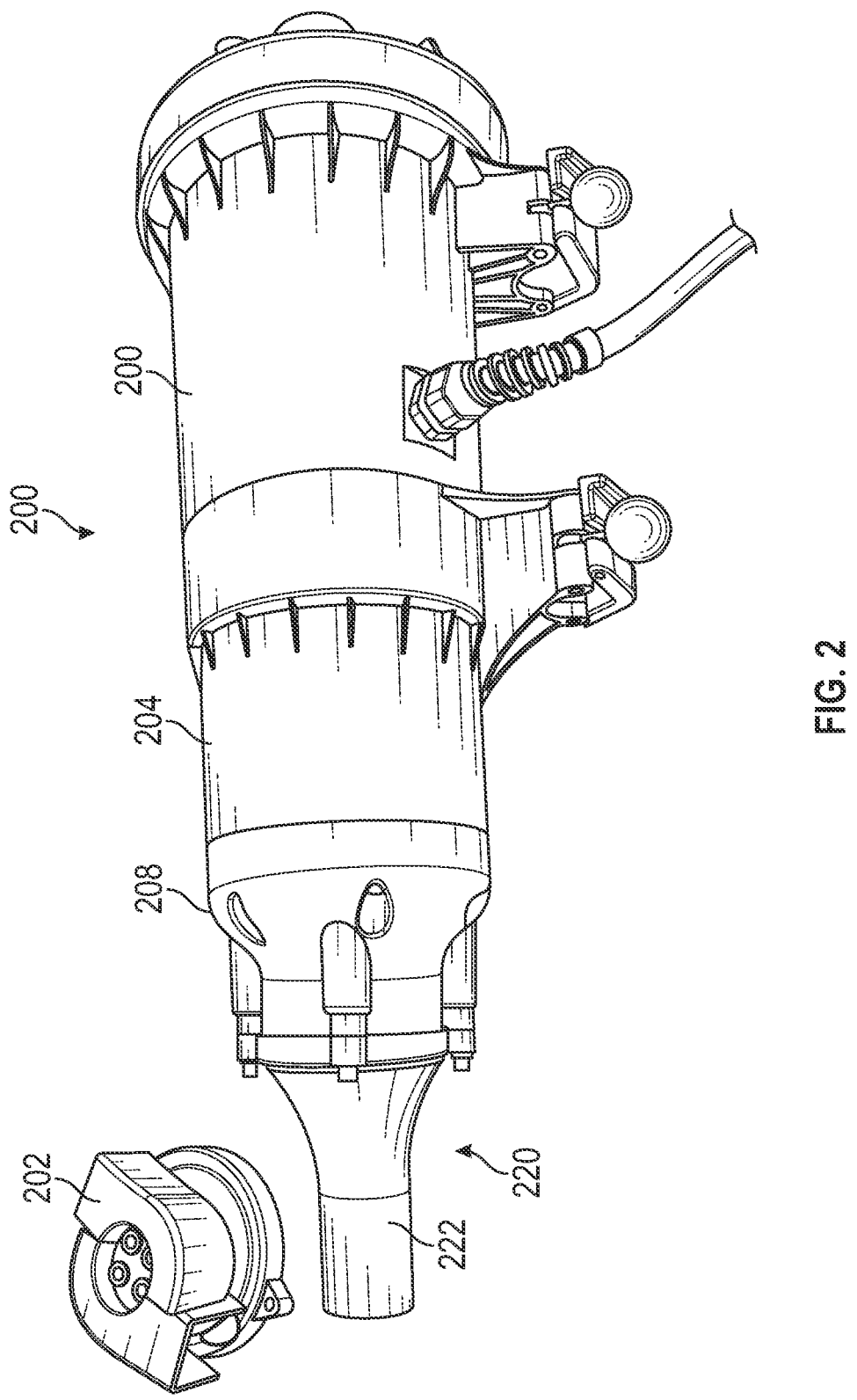
FIG. 2 is a side, perspective view of another embodiment of a liquid-submersible vacuum system.

With reference to FIG. 2, another aspect of a pool vacuum system 200 is illustrated, which is substantially similar to the pool vacuum system 100 of FIG. 1. The vacuum system 200 may include any of the features of the vacuum system 100 of FIG. 1 except as explicitly contradicted below.

The vacuum system 200 includes a diffuser cap 202 configured to detachably couple to a proximal end portion 208 of a proximal housing 204 of the vacuum system 200. The diffuser cap 202 is attached to the proximal housing 204 when it is desired to discharge filtered water back into the pool. When it is desired to discharge the filtered water to a location external to the pool, the diffuser cap 202 is detached from the proximal housing 204 and replaced with a vacuum-to-waste assembly 220. It is contemplated that the diffuser cap 202 and the vacuum-to-waste assembly 220 may be detachable from the proximal housing 204 using any suitable fastening mechanism, such as, for example, screws, adhesives, an interference fit, or the like.

With reference to FIGS. 2-5, the vacuum-to-waste assembly 220 is configured to receive filtered fluid from an impeller 206 (FIGS. 6 and 7) and convey the fluid to an external location. The vacuum-to-waste assembly 220 generally includes a discharge hose cap 222 and a stator assembly 224 configured to be received in the discharge hose cap 222 and in flush engagement with the impeller 206. The discharge hose cap 222 has a funnel shape and includes a conical distal end portion 222a, and a cylindrical proximal end portion 222b extending from the distal end portion 222a. The distal end portion 222a of the discharge hose cap 222 is configured to detachably engage the proximal end 208 of the proximal housing 204. For example, the distal end portion 222a of the discharge hose cap 222 may have a plurality of flanges 226 extending radially outward therefrom with each defining a hole 228 therethrough configured to receive a screw for securing the discharge hose cap 222 to the proximal end 208 (FIG. 2) of the proximal housing 204. The proximal end portion 222b of the discharge house cap 222 is configured to detachably secure to a hose or other suitable flexible tubing to allow for the transfer of water to a remote location.

The distal end portion 222a of the discharge hose cap 222 has an inner surface 230 having an annular ring 232 projecting radially inward therefrom, and a plurality of circumferentially-spaced tabs 234 extending radially inward therefrom. The annular ring 232 and the tabs 234 are configured to support the stator assembly 224 therein and prevent the stator assembly 224 from rotating relative to the discharge hose cap 222.

With reference to FIGS. 3-6, the stator assembly 224 includes a main body 236, a plurality of fins 238 secured to the main body 236, and an outer ring 240 secured to the plurality of fins 238. The main body 236 has a cone-shape such that the main body 236 tapers from a distal end portion 236a to a proximal end portion 236b thereof. The proximal end portion 236b of the main body 236 may have an appendage 240 (FIG. 6) protruding proximally therefrom configured to prevent fluid flow from becoming turbulent.

Figure 3:
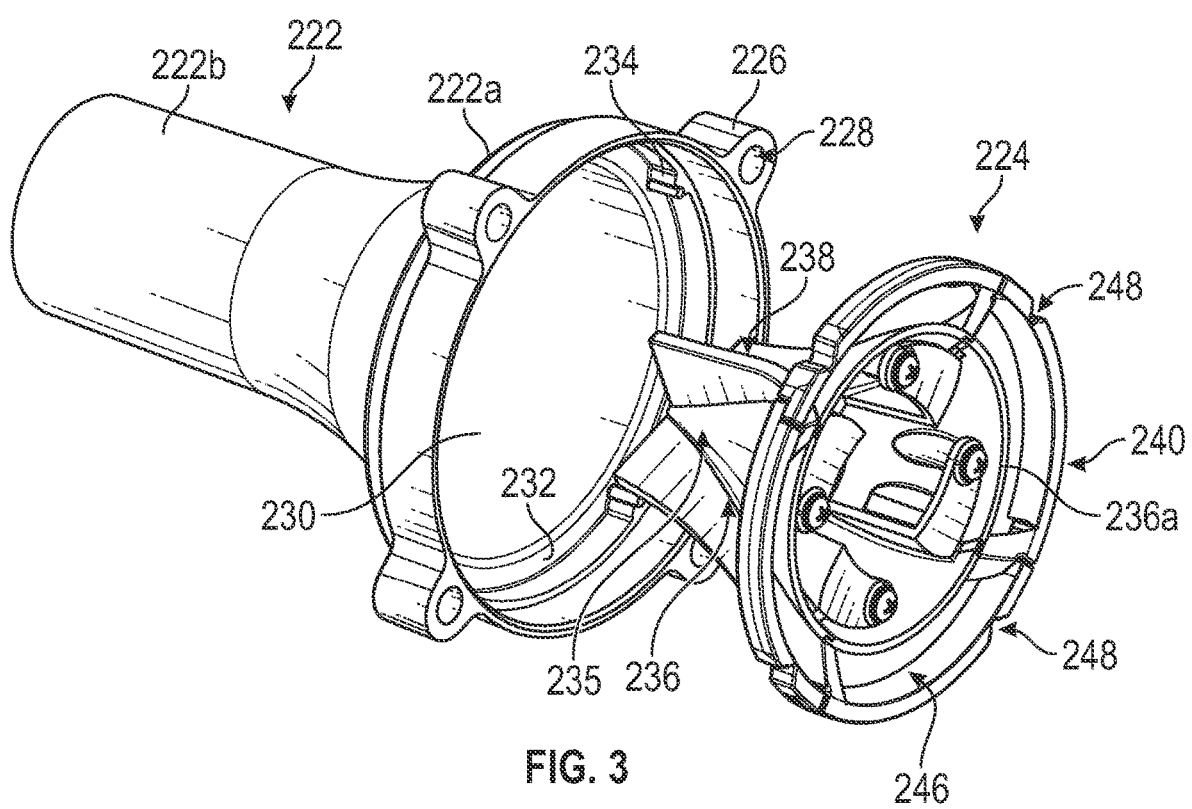
FIG. 3 is a bottom, perspective view illustrating a vacuum-to-waste assembly of the vacuum system of FIG. 2 including a stator assembly separated from a discharge hose cap.
Figure 4:
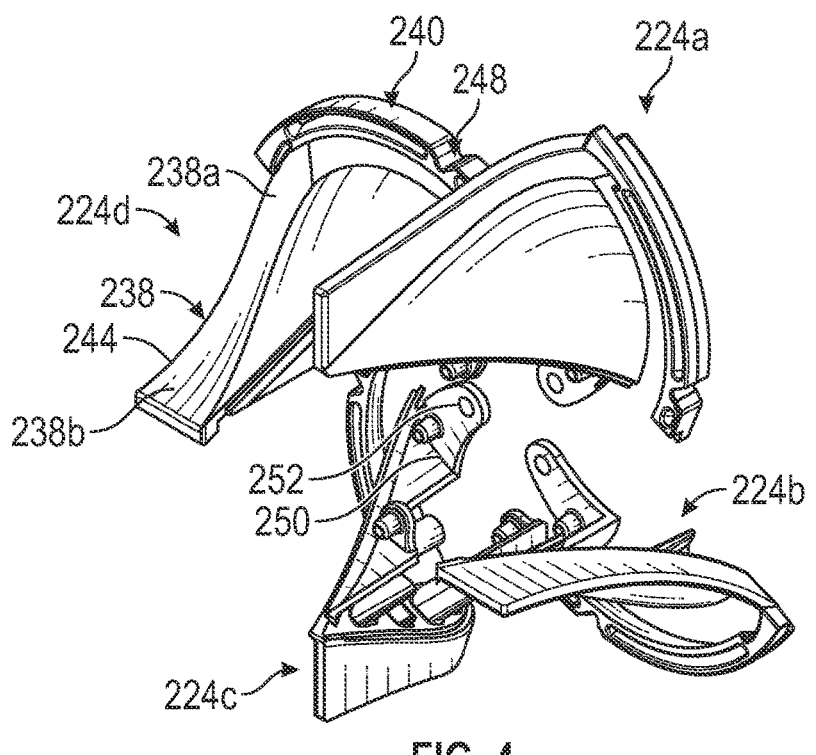
FIG. 4 is perspective view, with parts separated, of the stator assembly of FIG. 3.
Figure 6:
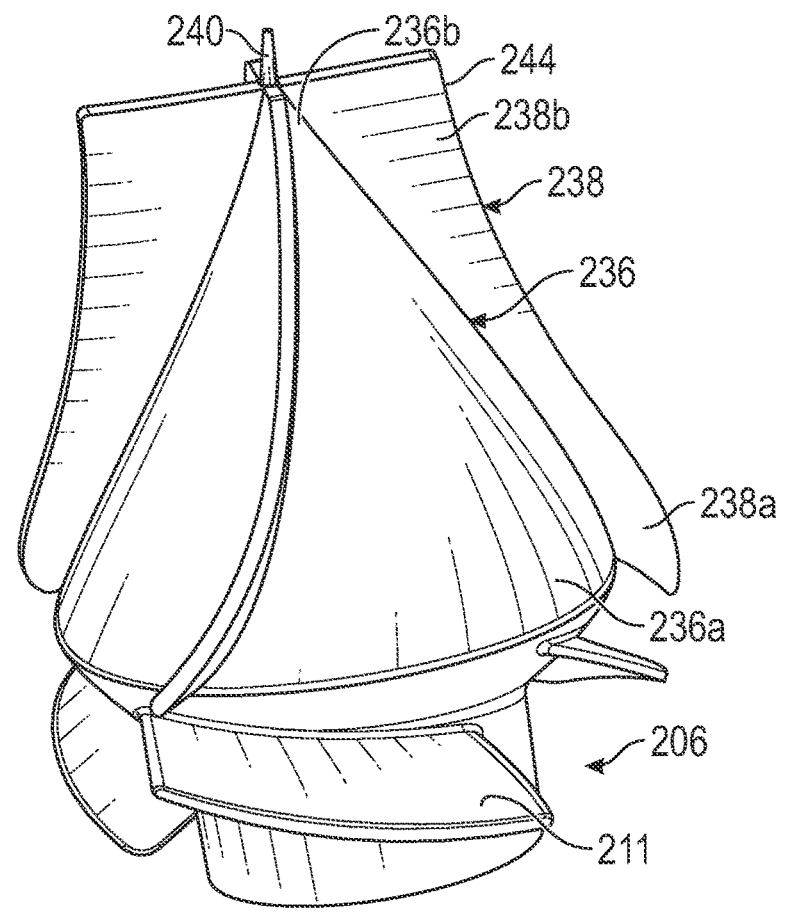
FIG. 6 is a perspective view, with parts removed, illustrating the stator assembly engaged with an impeller of the vacuum system of FIG. 2.

As best shown in FIGS. 3, 4, and 6, each of the fins 238 of the stator assembly 224 protrude radially outward from an outer surface of the main body 236 and extend from the distal end portion 236a of the main body 236 to the proximal end portion 236b of the main body 236. The fins 238 may be circumferentially spaced 90 degrees from one another to define a longitudinally-extending channel 235 (FIG. 3) between adjacent fins 238. The fins 238 each curve in a clockwise direction of the main body 236 when view in a proximal-to-distal direction such that a distal end portion 238a of one fin 238 is positioned clockwise (e.g., about 15 degrees) relative to a proximal end portion 238b of the same fin 238.

In aspects, the curvature of each of the fins 238 may be constant along their lengths, and in other aspects the curvature of each of the fins 238 may be greater at the distal end portion 238a thereof than at the proximal end portion 238b thereof. In aspects, each of the fins 238 may have a width (e.g., measured from the outer surface of the main body 236 to an outer-most edge 244 of the fin 238) that is constant along its length (e.g., measured from the proximal end portion 238b to the distal end portion 238a of the fin 238) or may taper from the proximal end portion 238b to the distal end portion 238a of the fin 238. The proximal end portion 238b of each of the fins 238 is configured to sit flush against the inner surface (not explicitly shown) of the cylindrical proximal end portion 222b of the discharge hose cap 222.

Figure 5:
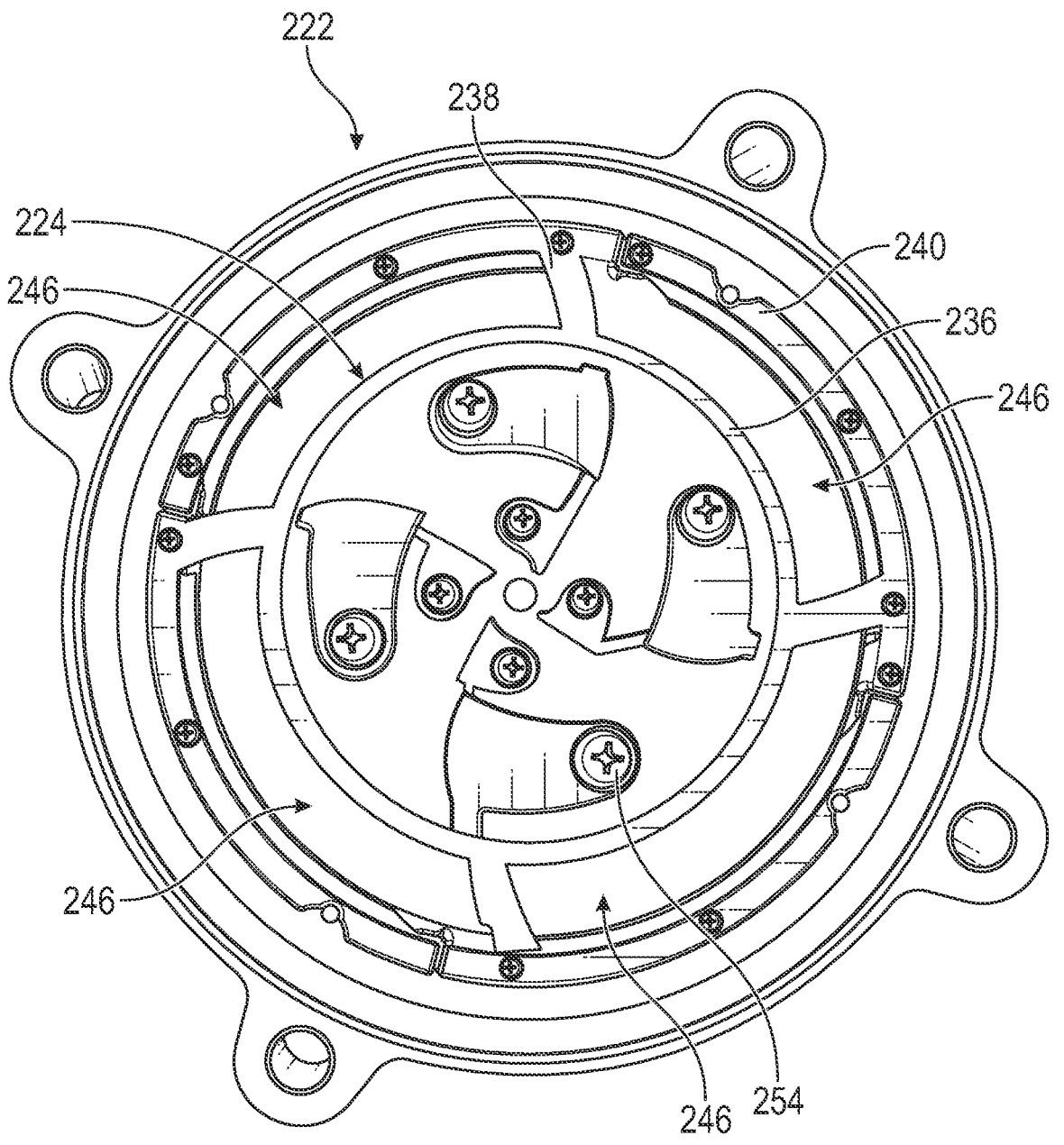
FIG. 5 is a bottom view illustrating the stator assembly assembled within the discharge hose cap.

With reference to FIGS. 3-5, the outer ring 240 of the stator assembly 222 is positioned about and radially spaced from the distal end portion 236a of the main body 236, and engaged with the distal end portion 238a of each of the fins 238. As such, the outer ring 240, the distal end portion 238a of the fins 238, and the distal end portion 236a of the main body 236 collectively define a plurality of discrete channels 246 configured to receive fluid therethrough. The outer ring 240 has an outer surface defining a plurality of recesses 248 therein configured for receipt of a respective tab 234 of the discharge hose cap 222 to non-rotatably secure the stator assembly 224 within the discharge hose cap 222.

With reference to FIG. 4, it is contemplated that the stator assembly 224 may be comprised of a plurality (e.g., four) of discrete components 224a, 224b, 224c, 224d each assembled to one another to form the stator assembly 224. More specifically, each of the four components 224a, 224b, 224c, 224d may include a ¼ section of the main body 236, one fin 238, and one ¼ section of the outer ring 240. To assemble the four components 224a, 224b, 224c, 224d to form the stator assembly 224, the four components 224a, 224b, 224c, 224d may include flanges 252 with holes 252 positioned in the respective ¼ section of the main body 236 of each of the components 224a, 224b, 224c, 224d. Adjacent ¼ sections of the main body 236 are attached to one another by securing a fastener 254 (FIG. 5) in the respective holes 252. In other aspects, the stator assembly 224 may be monolithically formed from a single piece of material or assembled to one another using other suitable fastening mechanisms. In aspects, the main body 236 and fins 238 are monolithically formed with one another and then coupled to the outer ring 240.

Figure 7:
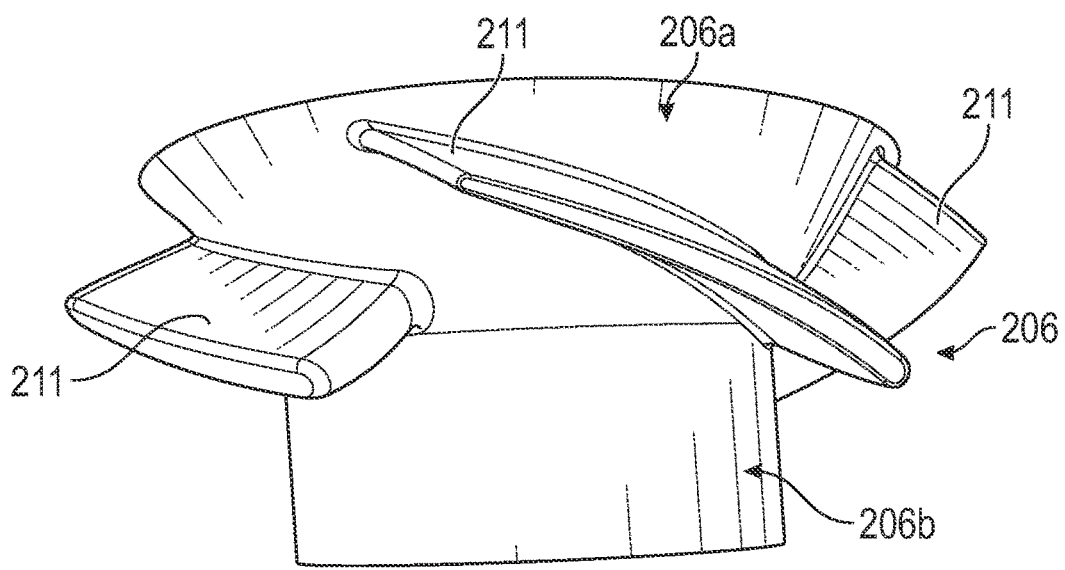
FIG. 7 is a side view illustrating the impeller of FIG. 6.

With reference to FIGS. 6 and 7, the impeller 206 of the vacuum system 200 is rotatably supported in the proximal end portion 208 of the proximal housing 204 (FIG. 2). The impeller 206 is configured to rotate within the proximal housing 204 in response to a rotation of a motor (e.g., the DC motor 108 of FIG. 1). In aspects, the impeller 206 may be operably coupled to the motor 108 via a motor shaft (e.g., the motor shaft 111 of FIG. 1) such that the motor 108 directly drives a rotation of the impeller 206.

The impeller 206 includes a cylindrical distal end portion 206b, and a conical proximal end portion 206a configured to sit flush against the distal end portion 236a (FIG. 6) of the main body 236. The proximal end portion 206a of the impeller 206 has the same or substantially same diameter as the distal end portion 236a of the main body 236 such that the impeller 206 covers a distal-most surface of the main body 236 without covering the plurality of channels 246 (FIG. 5) of the stator assembly 224. The impeller 206 further includes a plurality of fins 211 extending radially outward from the proximal end portion 206a thereof. The fins 211 have a length that extends at an angle relative to the length of the fins 238 of the stator assembly 224. For example, the length of the fins 211 of the impeller 206 extends from about 90 degrees to about 110 degrees relative to the lengths of the fins 238 of the stator assembly 224.

In operation, upon the impeller 206 rotating by the actuation of the motor 108, the fins 211 of the impeller 206 drive fluid upwardly through the channels 246 of the stator assembly 224, whereby the fins 238 of the stator assembly 224 guide the fluid upwardly (e.g., proximally) toward and through the discharge hose cap 222. The fins 238 of the stator assembly 224 prevent the fluid flow from becoming turbulent to allow for a higher rate of fluid flow from the impeller 206 to the discharge hose cap 222. More specifically, the rotational flow of fluid from the impeller 206 may create turbulence if left unchecked and discharged into an otherwise non-turbulent body of water—the stator assembly 224 removes the rotational direction of flow, thereby presenting a more axial flow of fluid, which is less resistant in the discharge hose cap 222 allowing for higher flow rates. In addition, due to the conical shape of the main body 236 of the stator assembly 224, the fluid pressure at a proximal end of the stator assembly 224 is lower than at a distal end thereof to accelerate the fluid distally through the stator assembly 224.

Figure 8A:
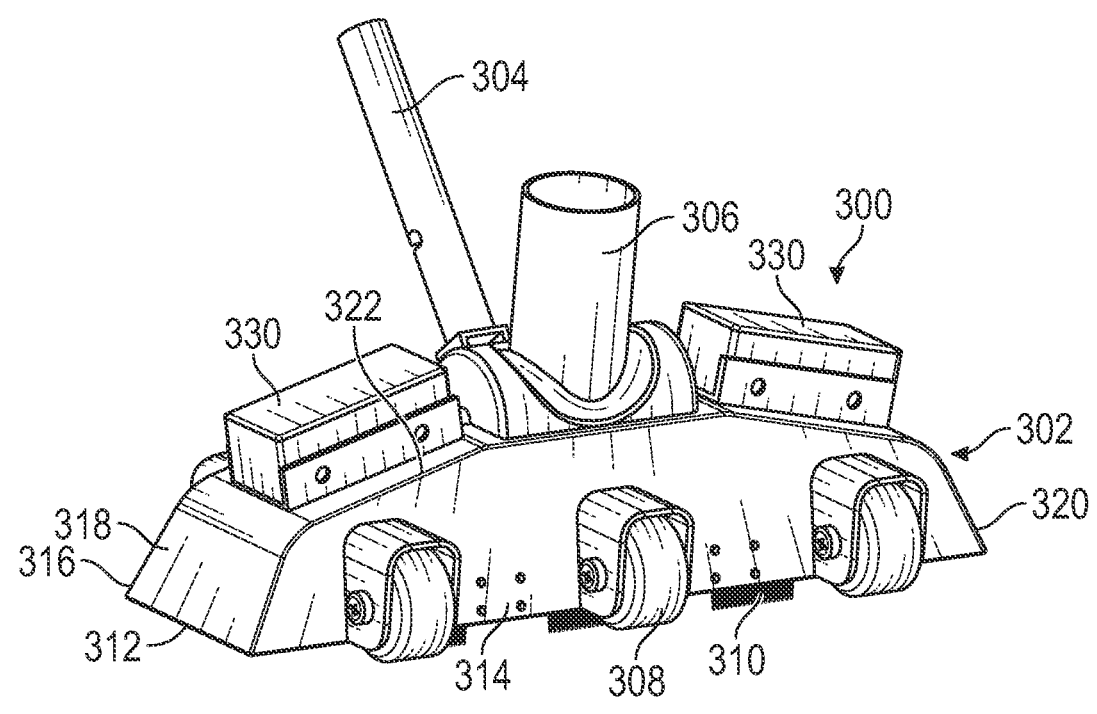
FIG. 8A is a front, perspective view illustrating a vacuum head of the vacuum system of FIG. 2.
Figure 8B:
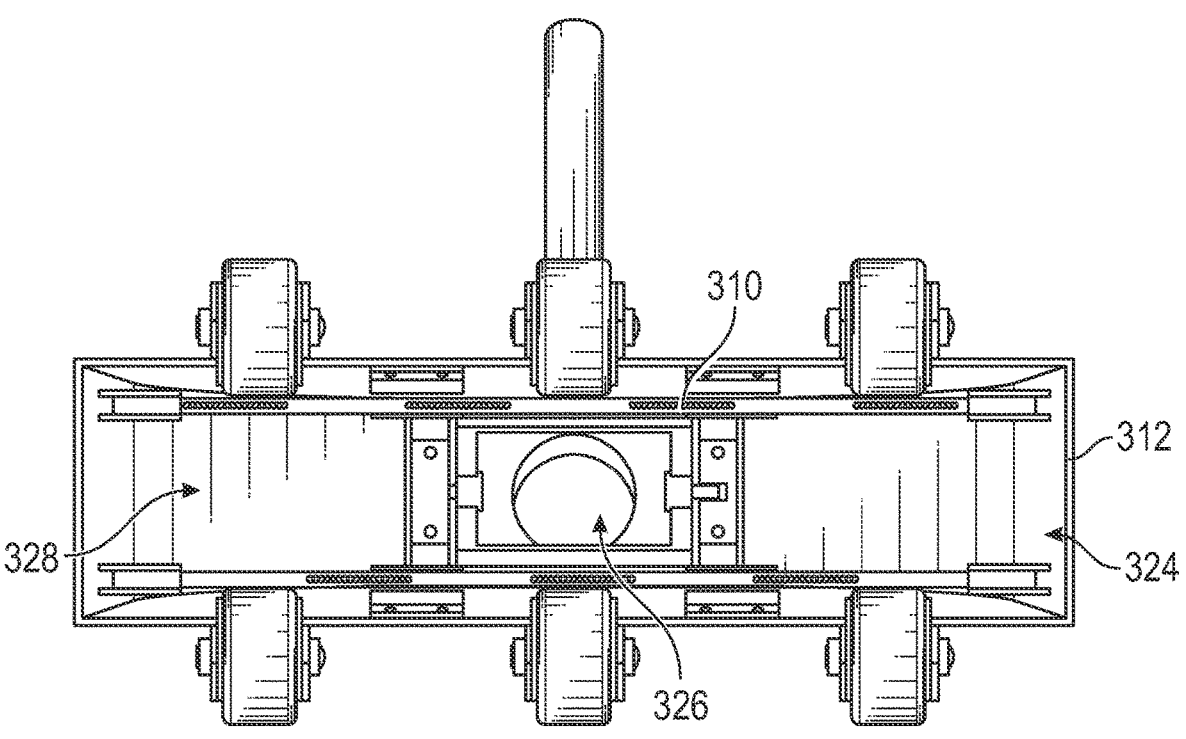
FIG. 8B is a bottom view illustrating the vacuum head of FIG. 8A.

With reference to FIGS. 8A and 8B, an embodiment of a vacuum head 300 for use with the vacuum system 200 of FIG. 2 is provided. The vacuum head 300 includes a housing 302, pole and hose connectors 304, 306 attached to the housing 302, a plurality of wheels 308, and a plurality of brushes 310.

The housing 302 has a rectangular-shaped bottom edge 312, a pair of long side walls 314, 316 extending upwardly from respective long sides of the bottom edge 312, a pair of short side walls 318, 320 extending upwardly from respective short sides of the bottom edge 312, and a top wall 322 positioned on each of the side walls 314, 316, 318, 320. The top wall 322 of the housing 302 has a pair of detachable weights 330 supported thereon to assist with maintaining the vacuum head 300 underwater and on a pool floor. The wheels 308 are attached to the pair of long side walls 314, 316 of the housing 302 to permit rolling of the vacuum head 300 and for suspending the bottom edge 312 of the housing 302 above the pool floor.

With reference to FIG. 8B, the bottom edge 312 defines an inlet 324, and the top wall 322 defines an outlet 326 that is spaced from the inlet 324 a selected height (e.g., from about 3 inches to about 6 inches). The housing 302 defines an internal cavity 328 that fluidly couples the inlet 324 and the outlet 326 to one another. The internal cavity 328 allows for greater suction through the outlet 326 of the housing 302 than would otherwise occur if the inlet 324 and the outlet 326 were the same size.

Persons skilled in the art will understand that the devices and methods specifically described herein and illustrated in the accompanying drawings are non-limiting exemplary aspects. It is envisioned that the elements and features illustrated or described in connection with one exemplary aspect may be combined with the elements and features of another without departing from the scope of the present disclosure. As well, one skilled in the art will appreciate further features and advantages of the disclosure based on the above-described aspects. Accordingly, the disclosure is not to be limited by what has been particularly shown and described, except as indicated by the appended claims.

What is claimed is:

1. A vacuum-to-waste assembly configured to receive filtered fluid from a liquid-submersible vacuum system and convey the filtered fluid to an external location, the vacuum-to-waste assembly comprising:
   a discharge hose cap defining a longitudinal passageway therethrough and configured to couple to a hose, the discharge hose cap including:
      a conical distal end portion including:
         an inner surface;
         an annular ring radially projecting from the inner surface; and
         a plurality of tabs extending from the annular ring; and
      a cylindrical proximal end portion extending from the conical distal end portion;
   a stator assembly configured to be received in the discharge hose cap, the stator assembly including:
      a conical main body comprising a plurality of discrete components, each having a flange that protrudes radially inwards toward a central area of the conical main body, each flange defining a hole therethrough, wherein adjacent discrete components are secured to each other via the holes of the respective flanges of the adjacent discrete components; and
      a plurality of fins protruding radially outward from the main body and extending along a length of the main body, wherein a pair of adjacent fins of the plurality of fins defines a channel therebetween configured to guide fluid proximally through the discharge hose cap, and wherein each component of the plurality of discrete components of the main body includes at least one fin of the plurality of fins,
      wherein each of the plurality of discrete components includes a ¼ section of the conical main body.

2. The vacuum-to-waste assembly according to claim 1, wherein the stator assembly is non-rotatably secured within the discharge hose cap via the plurality of tabs of the discharge hose cap such that the stator assembly is non-rotatable relative to the discharge hose cap.

3. The vacuum-to-waste assembly according to claim 1, wherein the stator assembly includes an outer ring positioned about and radially spaced from a distal end portion of the main body, the outer ring being engaged with a distal end portion of each of the plurality of fins.

4. The vacuum-to-waste assembly according to claim 3, wherein the outer ring, the distal end portion of each of the plurality of fins, and the distal end portion of the main body collectively define a plurality of discrete channels configured to receive fluid therethrough.

5. The vacuum-to-waste assembly according to claim 3, wherein the outer ring has an outer surface defining a plurality of recesses therein configured for receipt of a respective tab of the plurality of tabs of the discharge hose cap to non-rotatably secure the stator assembly within the discharge hose cap.

6. The vacuum-to-waste assembly according to claim 1, wherein the plurality of fins is circumferentially spaced from one another about the main body.

7. The vacuum-to-waste assembly according to claim 1, wherein each of the plurality of fins curve in a clockwise direction of the main body such that a distal end portion of a first fin of the plurality of fins is positioned clockwise relative to a proximal end portion of the first fin.

8. The vacuum-to-waste assembly according to claim 1, wherein each of the plurality of fins has an outer edge configured to sit flush against an inner surface of the discharge hose cap.

9. The vacuum-to-waste assembly according to claim 1, wherein the discharge hose cap has a funnel-shape.

10. A liquid-submersible vacuum system, comprising:
   a housing defining a chamber therein and having a proximal end portion and a distal end portion;
   a DC pump disposed within the chamber and configured to move water proximally toward the proximal end portion of the housing;
   an impeller positioned at the proximal end portion of the housing and configured to rotate in response to an activation of the DC pump, wherein the impeller includes a cylindrical distal end portion and a conical proximal end portion, and wherein the impeller includes a plurality of fins extending radially outward from the conical proximal end portion;
   a filter disposed within the housing, such that water moves through the filter during activation of the DC pump;
   a power converter configured to electrically connect to the DC pump for providing power to the DC pump, wherein the power converter is located remotely from the housing; and
   a vacuum-to-waste assembly including:
      a discharge hose cap defining a longitudinal passageway therethrough and configured to be in fluid communication with the chamber of the housing, the discharge hose cap including:
         a conical distal end portion including:
            an inner surface;
            an annular ring radially projecting from the inner surface; and
            a plurality of tabs extending from the annular ring; and
         a cylindrical proximal end portion extending from the conical distal end portion; and
      a stator assembly configured to be received in the discharge hose cap, the stator assembly including:
         a main body configured to be positioned adjacent and proximally of the impeller, wherein the main body of the stator assembly is comprised of a plurality of discrete components; and a plurality of fins protruding radially outward from the main body and extending along a length of the main body, wherein a pair of adjacent fins of the plurality of fins defines a channel therebetween configured to guide fluid proximally through the discharge hose cap, wherein each component of the plurality of discrete components of the main body includes at least one fin of the plurality of fins, wherein a number of the plurality of fins of the impeller is equal to a number of the plurality of fins of the stator assembly, and wherein each of the plurality of fins of the impeller extends at an angle relative to a respective fin of the plurality of fins of the stator assembly, wherein each of the plurality of discrete components includes a ¼ section of the main body.

11. The liquid-submersible vacuum system according to claim 10, wherein the main body of the stator assembly has a distal end portion configured to abut a proximal end portion of the impeller, the impeller being configured to rotate relative to the main body.

12. The liquid-submersible vacuum system according to claim 11, wherein the stator assembly is non-rotatably secured within the discharge hose cap via the plurality of tabs of the discharge hose cap such that the stator assembly is non-rotatable relative to the discharge hose cap.

13. The liquid-submersible vacuum system according to claim 10, wherein the stator assembly includes an outer ring positioned about and radially spaced from a distal end portion of the main body, the outer ring being engaged with a distal end portion of each of the plurality of fins.

14. The liquid-submersible vacuum system according to claim 13, wherein the outer ring, the distal end portion of each of the plurality of fins, and the distal end portion of the main body collectively define a plurality of discrete channels configured to receive fluid therethrough.

15. The liquid-submersible vacuum system according to claim 13, wherein the outer ring has an outer surface defining a plurality of recesses therein configured for receipt of a respective tab of the plurality of tabs of the discharge hose cap to non-rotatably secure the stator assembly within the discharge hose cap.

16. The liquid-submersible vacuum system according to claim 10, wherein the plurality of fins is circumferentially spaced from one another about the main body.

17. The liquid-submersible vacuum system according to claim 10, wherein each of the plurality of fins curve in a clockwise direction of the main body such that a distal end portion of a first fin of the plurality of fins is positioned clockwise relative to a proximal end portion of the first fin.

18. The liquid-submersible vacuum system according to claim 10, wherein each of the plurality of fins has an outer edge configured to sit flush against an inner surface of the discharge hose cap.

19. The liquid-submersible vacuum system according to claim 10, wherein the discharge hose cap has a funnel-shape and the main body has a conical shape.

20. The liquid-submersible vacuum system according to claim 10, further comprising a vacuum head configured to couple to the distal end portion of the housing, wherein the vacuum head includes:

a housing; and a plurality of wheels secured to the housing of the vacuum head, the housing of the vacuum head defining an internal cavity therein, an inlet port in fluid communication with the internal cavity, and an outlet port in fluid communication with the internal cavity and spaced from the inlet port, the inlet port having a larger volume than the outlet port.

* * * * *